United States Patent [19]

Owen et al.

[11] Patent Number: 4,737,352

[45] Date of Patent: Apr. 12, 1988

[54] USE OF SURFACTANTS IN ALUMINA PRECIPITATION IN THE BAYER PROCESS

[75] Inventors: David O. Owen, Aurora, Ill.; David C. Davis, Victoria, Tex.

[73] Assignee: Nalco Chemical Company, Naperville, Ill.

[21] Appl. No.: 36,389

[22] Filed: Apr. 9, 1987

[51] Int. Cl.$^4$ .......................... C01F 7/00; C01F 7/06; C01F 7/02; C22B 21/00
[52] U.S. Cl. .................................... 423/122; 423/130; 423/625
[58] Field of Search ............... 423/122, 625, 626, 130, 423/121

[56] References Cited

U.S. PATENT DOCUMENTS 4,608,237 8/1986 Roe et al. ........................... 423/122

FOREIGN PATENT DOCUMENTS 233434 12/1959 Australia ............................ 423/122

Primary Examiner—Patrick P. Garvin, Sr.
Assistant Examiner—George R. Fourson
Attorney, Agent, or Firm—Kinzer, Plyer, Dorn, McEachran & Jambor

[57] ABSTRACT

A method and composition for producing a more coarse alumina trihydrate crystal in a Bayer process pregnant liquor, involving the addition of approximately 5–400 mg/l of surfactant-oil, the oil dissolving the surfactant which can be selected from a host of surfactants which are stable in (hot) caustic solutions and capable of dispersing hydrophobic liquids in the Bayer liquor. The preferred embodiment involves the use of tall-oil fatty acids; a number of equivalent surfactants are established. The oil or hydrocarbon (hydrophobic) liquid can be selected from paraffinic oils, naphthenic oils, mineral seal oils, fuel oils, and bottoms or residue from a $C_{10}$ alcohol distillation.

4 Claims, No Drawings

USE OF SURFACTANTS IN ALUMINA PRECIPITATION IN THE BAYER PROCESS

This invention is concerned with treatment of a Bayer process green liquor from which aluminum values are precipitated.

In the Bayer process for Bauxite ore beneficiation, crystallization and precipitation of solubilized alumina trihydrate values from caustic liquors, referred to herein as Bayer process liquor, is a critical step towards the economic recovery of aluminum values. Bayer process operators optimize their precipitation methods so as to produce the greatest possible yield from the Bayer process liquors while trying to achieve a given crystal size distribution. It is desirable in most instances to obtain relatively large crystal size since this is beneficial in subsequent processing steps required to produce aluminum metal. Production is often limited by processing conditions under which the crystallization and precipitation is conducted. These processing conditions vary from one plant to the next and include, but are not limited to, temperature profiles, seed charge, seed crystal surface area, liquor loading, liquor purity, and the like.

It is an extremely well known fact that organic impurities in the Bayer process liquors, which are normally derived from organics present in the Bauxite ore, can have a devastating effect on Bayer process crystallization practice.

In addition to humate chemicals derived from the impure Bauxite ores, another primary organic contaminant is sodium oxalate, thought to be produced during the high temperature digestion of the raw material Bauxite ore in highly concentrated caustic solutions. Regardless of the source of sodium oxalate, its presence in Bayer process liquors is undesirable for a number of reasons, as explained in U.S. Pat. No. 4,608,237.

Sodium oxalate often crystalizes and co-precipitates from solution over essentially the same temperature profiles as does the desired alumina trihydrate crystals. Fine oxalate particles act as secondary nucleation sites for alumina trihydrate, thereby increasing the total number of alumina crystals during the alumina trihydrate precipitation. This has an effect of causing a shift to smaller alumina trihydrate crystal size distribution and the production of very finely divided materials which for the most part are not wanted. However, some of the smaller size alumina trihydrate is needed, as will be explained. The general criterion is not to produce any more of the fine particle crystal than is needed for reseeding.

The oxalate crystals, which are extremely finely divided and have an extremely large surface area, adhere to the surfaces of growing alumina trihydrate agglomerates. This adhesion of the oxalate crystalites interferes with both alumina trihydrate unit crystal growth and the agglomeration of alumina hydrate crystals. Occlusion of sodium oxalate crystalites within the growing alumina trihydrate multicrystal also results in the weakening of the final crystal structure. As noted above, this is very undesirable since it leads to the development of excessive amounts of extremely finely divided alumina trihydrate both during the precipitation process as well as in the alumina trihydrate calcination processes which follow.

PRIOR ART: OBJECTIVES OF THE INVENTION

The disclosure in U.S. Pat. No. 4,608,237 is the prior art we address. According to the disclosure in that patent, the precipitation of alumina hydrate crystals of coarse or large size from a Bayer process green liquor is aided by employing certain latex polymers. Being in the latex form, these polymers are expensive to produce. Our object is to achieve yields of coarse alumina trihydrate particles at least quantitatively equal to the achievement under U.S. Pat. No. 4,608,237 but achieved merely by blending a fatty acid (or equivalent surfactant) and an oil, the two being soluble in one another, so that the treatment (a mere blend) can be a matter of having the two liquids available at the plant and introducing them into the precipitation tank in-line with introduction of the green liquor charged into the precipitating tank. Another object of the invention is to present an economic alternative to the polymeric treatment of U.S. Pat. No. 4,608,237 by which to meet the general criterion of fine particle crystal size mentioned above.

THE INVENTION IN PRACTICE: EXAMPLES

In the examples to follow, Bayer process pregnant or green liquors at different plants (Plant A, Plant B, and so on) were employed to determine if the invention was in any way limited by variations in precipitation parameters employed by different producers of aluminum, known only to them. These parameters include the nature of the ore, the amount of impurities whether organic or inorganic, caustic concentrations, and especially the conditions inside the precipitation tank which include the form and purity of the seed crystals (small particles of alumina trihydrate), the degree of agitation, time, temperature, and so on. While the details of the precipitation techniques at the various plants are not known, it is known that they do vary widely.

We found the invention in practice is unaffected by different proprietary precipitation techniques involving process parameters unknown to us. This fact is of great significance because it establishes that regardless of the proprietary (unpublished) processing parameters maintained inside the precipitating tank, the present invention for actual practice only requires blending and in-line injection of the two-constituent solution which composes the treatment. These constituents are (A) a surfactant which will not degrade to anything less than a tall oil equivalent in the presence of a hot (up to 180°–190° F.) strong caustic solution (e.g., 200 g/l alkalinity) together with (B) an oil carrier or solvent vehicle for the fatty acid. The oil need only be a solvent for the surfactant and have a boiling point safely above the temperature of the hot Bayer green liquor undergoing precipitation.

The preferred surfactant is tall oil fatty acid, but there are a host of equivalents. Thus, the fatty acid is one having at least a saturated or unsaturated four carbon alkyl backbone, with or without one or more carboxylic acid, ester, anhydride or sulfate surfactant functional groups attached directly or by a succinic alkyl linkage. Advantageously the fatty acid may contain at least an eight carbon backbone with at least one of the above functional groups attached.

The oil carrier may vary widely; the surfactants are oil soluble and there are many oils with a boiling point above say 200° F. Thus the oil may be a fatty alcohol-ether-ester complex derived from $C_{10}$ alcohol distillation; it may be one selected from the paraffinic series, it may be an aromatic oil (e.g. naphthenic oil) or it may be any mixture of these. The oil species that are possible, as equivalents, would represent an almost endless list and our broad-based examples, though few in number, are intended to emphasize this feature of the invention.

The most preferred embodiment is a solution of tall oil fatty acid in a $C_{10}$ alcohol distillation residue as the oil carrier, in the weight proportion of about 15:85, the dosage being about 20 mg/l. The next preferred embodiment is tall oil fatty acid (surfactant) in naphthenic oil as the oil carrier, in the weight proportion of 15:85 and the dosage being about 20 mg/l. The preferred oil carrier (fatty acid solvent) is the $C_{10}$ alcohol distillation residue having a boiling point of about 250° C. (482° F.). It is light yellow to yellowish brown in color and has a specific gravity of 0.862, $OH^-$ number 90, SAP No. 50, weight percent acetic 0.07 and carbonyl 0.5. Its main source (and commercial description) is the distillation bottoms or residue from distilling a $C_{10}$ alcohol. Chemically, it is 57-73 weight percent of primary branched chain $C_{10}$-$C_{22}$ alcohols (classed as fatty alcohols) and 29-41 weight percent of mixed long chain esters and ethers ($C_{18}$-$C_{33}$ ester; $C_{18}$-$C_{22}$ ether).

In all examples, the green or pregnant liquor (charge) employed for alumina trihydrate precipitation is the hot caustic solution obtained after elimination of the red mud in the Bayer process. it is not necessary to an understanding of this invention to outline the whole Bayer process to those having skill in that art. The green liquor, after red mud separation, is a hot, caustic filtrate, the commerical production green liquor containing the aluminum values as dissolved sodium aluminate. This liquor and recirculated fine particle alumina trihydrate seeds are charged into a suitable precipitating tank or a series of connecting tanks. Here, the charge is cooled under agitation to stress the contents, causing precipitation of alumina hydrate crystals on the seeds which constitute growth sites.

Complete elimination of the fine particle material (e.g. $-325$ mesh or smaller) is not wanted. There needs to be a remnant source of seeds, following precipitation, for recirculation to serve the next generation of repeated growth in a continuous process.

In brief, the precipitation process involves nucleation followed by (a) initial crystal growth and (b) agglomeration of those crystals into a coarse or sandlike alumina trihydrate particle which will later be dried, and often calcined to obtain $Al_2O_3$ as the commerical product of value.

Also, in the examples to follow, the "oil carrier," unless otherwise noted, is the alcohol distillation residue identified above, and the "fatty acid" is tall oil. Percents are weight percent.

The object of Examples 1A, 1B and 1C was to determine the response using different dosages of fatty acid/oil blend with different seed charges imposed on the green liquor of Plant A. Response in all examples is the percent reduction to a $-325$ mesh fraction of the aluminum hydrate crystal, equivalent to 44 to 45 microns. The greater the reduction, up to a limit, the better the performance in producing the large size crystals for calcination. The "blank" in all examples is an undosed green liquor from the plant site.

EXAMPLE 1A

Charge: Plant A green liquor; washed fine seed.
Treatment:
 15% fatty acid (refined tall oil)
 85% oil carrier

| Dose (mg/l) | % Reduction |
| --- | --- |
| Blank | 0.0 |
| 10 | +5.1 |
| 20 | +17.2 |
| 50 | +31.4 |
| 100 | +43.8 |
| 200 | +63.0 |
| 400 | +65.0 |

EXAMPLE 1B

Charge: Plant A green liquor; unwashed fine seed
Treatment:
 15% fatty acid (refined tall oil)
 85% oil carrier

| Dose (mg/l) | % Reduction |
| --- | --- |
| Blank | 0.5 |
| 20 | +15.7 |
| 50 | +31.2 |
| 100 | +50.0 |

Comparing 1A and 1B it is seen that there is little difference in the effect of the treatment whether or not the (recirculated) fine seed is washed for more purity.

EXAMPLE 1C

Charge: Plant A; coarse seed (washed)
Treatment:
 15% Fatty acid (tall oil, refined)
 85% Oil carrier

| Dose (mg/l) | % Reduction |
| --- | --- |
| Blank | 0.0 |
| 50 | +66.7 |
| 100 | +66.7 |

Example 1C shows a coarser seed particle has no adverse effect on the present treatment; compare Example 1A, "fine seed."

EXAMPLE 1D

Charge: Plant B; fine seed (washed)
Treatment:
 15% Fatty acid (unrefined tall oil)
 85% Oil carrier

| Dose (mg/l) | % Reduction |
| --- | --- |
| Blank | 0.0 |
| 10 | +29.0 |
| 25 | +24.0 |
| 50 | +26.0 |

EXAMPLE 1E

Charge: Plant C; fine seed (unwashed)
Treatment:
 15% Fatty acid (unrefined tall oil)
 85% Mineral seal oil (carrier)

| Dose (mg/l) | % Reduction |
| --- | --- |
| Blank | 0.0 |

| Dose (mg/l) | % Reduction |
| --- | --- |
| 50 | +30.0 |

Examples 1D and 1E verify that beneficial results in percent reduction are achieved with different plant processes for precipitation, different seed charges and different tall oil purity.

In Example 1E, the oil carrier is paraffinic, (b.p 150° C. or higher), performing every bit as well as the $C_{10}$ alcohol distillation residue.

The object of the following example (2A) was to determine the benefit, if any, using different ratios of fatty acid and oil carrier, compared to the fatty acid employed by itself as a treatment. The fatty acid in this example was unrefined tall oil.

EXAMPLE 2A

Charge: Plant B; fine seed (washed)

| Treatment | Dose (mg/l) | % Reduction |
| --- | --- | --- |
| Blank | 0 | 0 |
| Fatty acid in oil carrier | | |
| 15% | 50 | +23 |
| 30% | 50 | +37 |
| 45% | 50 | +35 |
| 60% | 50 | +21 |
| 75% | 50 | +18 |
| Fatty acid alone | | |
| 100% | 50 | −25 |

From this example, a 30–45 weight percent ratio of fatty acid in oil is optimum. Negative results are achieved without the oil carrier for the fatty acid.

The object of the following example is to determine if beneficial results are obtained regardless of the order in which the components are added. The fatty acid was refined tall oil.

EXAMPLE 3A

Charge: Plant A; fine seed (washed)

| Treatment | Dose (mg/l) | % Reduction |
| --- | --- | --- |
| Blank | 0 | 0 |
| Fatty acid (15%) in oil carrier | 100 | +33.6 |
| Fatty acid followed by oil carrier | 15 + 85 | +43.4 |
| Oil carrier followed by fatty acid | 85 + 15 | +38.9 |

Desirable results were obtained regardless of the order of addition.

The following two examples were undertaken to determine whether a fatty acid (refined tall oil) dissolved in an oil carrier performs better than an oil carrier alone. Also, whether there would be an appreciable difference between a petroleum-derived (paraffin series) oil carrier and an aromatic oil employed as the carrier. In these two examples (4A, 4B) the fatty acid was refined tall oil.

EXAMPLE 4A

Charge: Plant A; fine seed (washed)

| Treatment | Dose (mg/l) | % Reduction |
| --- | --- | --- |
| Blank | 0 | 0 |
| 15% fatty acid in oil carrier | 100 | +30.0 |
| Oil carrier only | 85 | +14.1 |
| 15% fatty acid in high aromatic oil[1] | 100 | +24.3 |
| High aromatic oil[1] | 85 | 0 |
| 15% fatty acid in oil (~15% aromatic oil)[2] | 100 | +22.4 |
| Oil (~15% aromatic oil) alone[2] | 85 | +4.4 |
| 15% fatty acid in low aromatic oil[3] | 100 | +34.6 |
| Low aromatic oil alone | 85 | +15.1 |

[1]Exxon Aromatic 150 (98%)
[2]VM&P Naptha
[3]Exxon low odor paraffinic oil (4% aromatic)

EXAMPLE 4B

Charge: Plant B; fine seed (washed)

| Treatment | Dose (mg/l) | % Reduction |
| --- | --- | --- |
| Blank | 0 | 0 |
| 15% fatty acid in naphthenic oil | 50 | +36 |
| 15% fatty acid in paraffinic oil | 50 | +27 |
| 15% fatty acid in oil carrier | 50 | +28 |
| 15% fatty acid in mineral oil | 50 | +25 |

The data of these two examples show inferior performance when an oil (whether alcoholic, aliphatic or aromatic) is used alone, without any fatty acid, but the rank of the oil carrier (aliphatic, alcoholic, aromatic or mixed) is immaterial.

Example 5A, which follows, was to determine any synergistic effect of the fatty acid/oil blend compared to each separate component by itself.

EXAMPLE 5A

Charge: Plant C; fine seed (unwashed)

| Treatment | Dose (mg/l) | % Reduction in −325 Mesh |
| --- | --- | --- |
| Blank | 0 | 0 |
| 15% fatty acid in mineral seal oil | 50 | +30 |
| 100% mineral seal oil | 50 | 0 |
| 100% fatty acid | 50 | −41 |

The tall oil fatty acid by itself gives inferior performance compared to the paraffinic oil by itself (which gives nothing more than a nul result, the same as the Blank) but as will be shown by Examples 6A and 6B many different species of fatty acids are effective when combined with an oil carrier.

EXAMPLE 6A

Charge: Plant A; fine seed (washed)

| Treatment | Dose (mg/l) | % Reduction in −325 Mesh |
| --- | --- | --- |
| Blank | 0 | 0 |
| 15% refined tall oil in oil carrier | 100 | +24.2 |

-continued

| Treatment | Dose (mg/l) | % Reduction in −325 Mesh |
| --- | --- | --- |
| 15% unrefined tall oil in oil carrier | 100 | +7.0 |

EXAMPLE 6B

Charge: Plant A; fine seed (washed)

| Treatment | Dose (mg/l) | % Reduction in −325 Mesh |
| --- | --- | --- |
| 15% fatty acid (low rosin) in an oil carrier | 50 | +29 |
| 15% fatty acid (high rosin) in an oil carrier | 50 | +25 |
| 15% fatty acid (high pitch) in an oil carrier | 50 | +24 |
| 15% mixture of oleic and stearic acids in an oil carrier | 50 | +31 |
| 15% stearic acid in an oil carrier | 50 | +34 |
| 15% oleic acid in an oil carrier | 50 | +20 |
| 15% n-octenylsuccinic anhydride in an oil carrier | 50 | +12 |
| 15% n-dodecenylsuccinic anhydride in an oil carrier | 50 | +16 |
| 15% isomerized dodecenylsuccinic anhydride in an oil carrier | 50 | +19 |

In Example 6B, the fatty acids of the first three compositions tested were respectively a tall oil with low rosin content, one with high rosin content and one with a high content of pitch, none of which made any appreciable or noteworthy difference. In this example (6B) all the acids are equated to the fatty acid class because the alkenyl succinic anhydrides hydrolyze in the Bayer pregnant liquor to alkenyl (dicarboxylic) fatty acid.

The following three examples demonstrate that surfactants other than a fatty acid may be successfully employed as an equivalent.

EXAMPLE 7A

Charge: Plant A; fine seed (washed)

| Treatment | Dose (mg/l) | % Reduction |
| --- | --- | --- |
| Blank | 0 | 0 |
| 15% sodium lauryl sulfate in oil carrier | 100 | +26.5 |
| 15% complex[1] phosphate ester in oil carrier | 100 | +31.4 |
| C12 linear alkyl -amino butyric acid in oil carrier[2] | 100 | +29.4 |

[1]GAFAC BH-650 (GAF Company)
[2]this carboxy acid is also known as betaine

EXAMPLE 7B

Charge: Plant B; fine seed (washed)

| Treatment | Dose (mg/l) | % Reduction |
| --- | --- | --- |
| Blank | 0 | 0 |
| Sulfonated tall oil in oil carrier | 50 | +17 |
| 15% methacrylic acid stearylmethacrylate copolymer in oil carrier | 50 | +18 |
| 15% fatty amide[1] in mineral seal oil | 50 | +14 |

[1]amide of refined tall oil, which degrades to tall oil in the green oil Bayer liquor.

EXAMPLE 7C

Charge: Plant C; fine seed (washed)

| Product | Dose (mg/l) | % Reduction in −325 Mesh |
| --- | --- | --- |
| Blank | 0 | 0 |
| 15% fatty amide[1] in mineral seal oil | 50 | +22 |

[1]amide of refined tall oil which degrades to tall oil in the green Bayer liquor

EXAMPLE 8A

This example was to determine whether the fatty acid/oil treatment of the present invention would be effective when coupled with a Bayer process liquor at Plant X having no appreciable, if any, oxalate in the green liquor. The treatment remained effective, that is, the absence of the oxalate made no difference:

| Wt. % | | Dose (mg/l) | % Reduction |
| --- | --- | --- | --- |
| 15 | Tall Oil Amide | 50 | 22 |
| 85 | Mineral Seal Oil | | |
| 15 | Refined Tall Oil | 50 | 30 |
| 85 | Mineral Seal Oil | | |
| 15 | Crude Tall Oil Amide | 50 | 30 |
| 85 | Oil Carrier | | |
| 100 | Refined Tall Oil | 50 | 0 |
| 100 | Mineral Seal Oil | 50 | 0 |
| | Blank | — | 0 |

The examples are intended to demonstrate that the useful surfactants cover a wide range of chemical variants with or without attached functional groups which may contribute more surface activity to the surfactant compound. Therefore, many equivalents may be employed to supplant tall oil as long as the surfactant will disperse the oil in the hot caustic Bayer green liquor. The oil, as noted, is a high boiling point solvent for the surfactant and again there is a wide range of equivalents for the preferred species which is the distillation bottoms from distilling a $C_{10}$ alcohol by oxy processing. Hence while we have set forth a preferred embodiment of the invention it is to be understood this is capable of variation and modification.

It will be seen from the foregoing that under the present invention practiced with a hot caustic Bayer process green liquor, the treatment to shift or bias precipitation of alumina trihydrate crystals toward the coarser size is a surfactant combined with an oil. The oil itself is a solvent for the surfactant, with a boiling point well above the temperature prevailing during precipitation, while the surfactant in turn is a dispersant or emulsifier for the oil.

We claim:

1. In the method for producing alumina trihydrate crystals by crystallization of alumina trihydrate from a hot, caustic pregnant Bayer process liquor, to obtain a reduced percent of small size crystals of $-325$ mesh fraction thereby to increase the yield of crystals coarser than $-325$ mesh subsequently to be processed to yield aluminum, the improvement comprising the addition to the pregnant liquor, after red mud separation and immediately prior to crystallization of alumina trihydrate, of two mutually soluble components (A) and (B) in an amount effective to increase the yield of the coarser crystals, component (A) being a surfactant which will disperse component (B) in the pregnant liquor and component (B) being an oil in which the surfactant is dissolved and having a boiling point above the temperature prevailing alumina hydrate crystallization.

2. A method according to claim 1 in which component (B) is an oil selected from the group consisting of:
   (1) paraffinic;
   (2) naphthenic;
   (3) mixed paraffinic and aromatic;
   (4) the residue of $C_{10}$ alcohol distillation.

3. A method according to claim 1 in which the surfactant is a tall oil fatty acid.

4. A method according to claim 3 in which the oil is the residue of $C_{10}$ alcohol distillation.

* * * * *

UNITED STATES PATENT AND TRADEMARK OFFICE
CERTIFICATE OF CORRECTION

PATENT NO. : 4,737,352
DATED : April 12, 1988
INVENTOR(S) : David O. Owen and David C. Davis It is certified that error appears in the above—identified patent and that said Letters Patent is hereby corrected as shown below:

Column 3, line 28, change "it" to --It--;

Column 3, line 60, change "to", second occurrence, to -- or --.

Column 6, Example 4B, second column change "Does" to --Dose--.

Signed and Sealed this

Thirty-first Day of January, 1989

*Attest:*

DONALD J. QUIGG

*Attesting Officer*      *Commissioner of Patents and Trademarks*